Nov. 6, 1928.

E. A. EVERETT 1,690,364

MEANS FOR FOCUSING LIGHT SOURCES IN PROJECTORS

Filed June 18, 1926

INVENTOR.
Edward A. Everett
BY
*M. N. Laughridge*
ATTORNEY.

Patented Nov. 6, 1928.

1,690,364

UNITED STATES PATENT OFFICE.

EDWARD A. EVERETT, OF NEW YORK, N. Y.

MEANS FOR FOCUSING LIGHT SOURCES IN PROJECTORS.

Application filed June 18, 1926. Serial No. 116,959.

Figure 1:
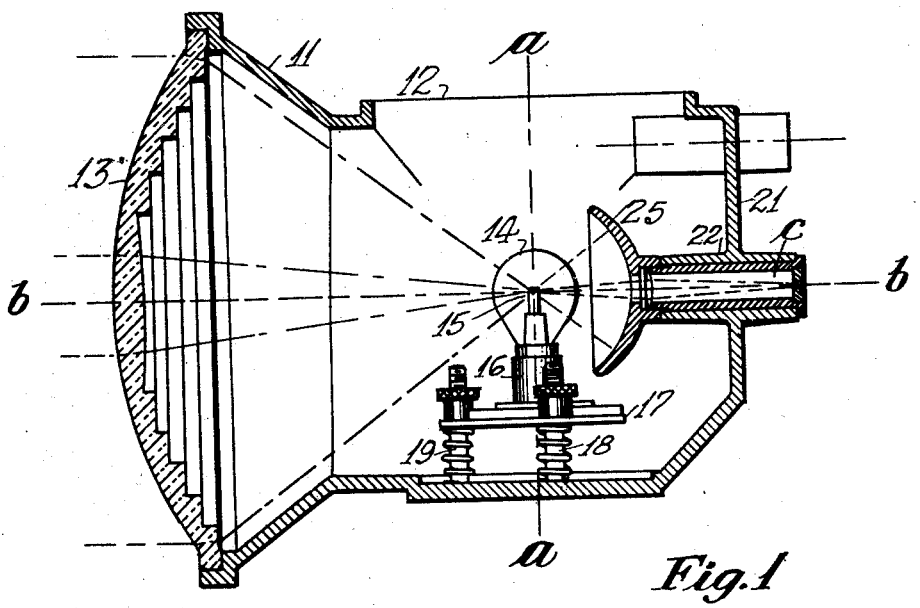
Figure 2:
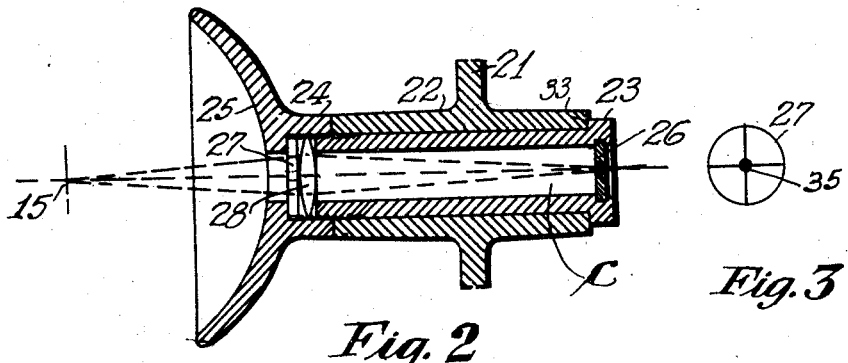
Figure 3:
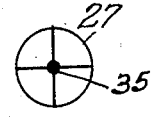
Figure 4:
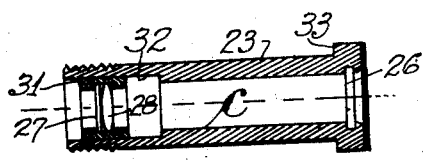
Figures 5, 6:
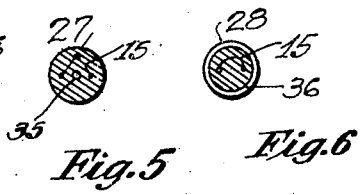

This invention relates to light projectors particularly of the type used in railway signals and it has for its objects to provide a simple and effective means for focusing the source of light with relation to the lens of the projector whereby the maximum results are obtained from a weak source of illumination. The objects of the invention and the method of applying the same will be more particularly understood from the following specification and the accompanying drawings, in which, Fig. 1, is a sectional elevation of a railway signal lamp embodying my invention, Fig. 2 is a cross-section of the focusing tube used in Fig. 1. Fig. 3 is a detail used in the construction of the focusing tube; Fig. 4 shows in section a modified construction of the sighting tube and Figs. 5 and 6 are details.

In railway light signals which are used to project a beam of light for a distance along the track, it is common practice to use concentrated filament electric bulbs as the source of illumination for these signals. This filament has a comparatively low candle power which is concentrated at a point and for proper operating results it is essential that this point be located in the exact focal point of the lens or reflector. The present invention embodies a sighting device for locating this focal point.

The bulb is provided with an ordinary base supported on a stand and in view of the fact that the filament in commercial bulbs does not bear a fixed relation to the base, the base is supported on an adjustable stand similar to that shown in U. S. Patent 1,535,218 issued April 28, 1925.

It has been common practice heretofore to locate the source of illumination by sighting on the axial line of the projecting lens and by sighting back from the lens on its focal centre on another line at right angles to the axial line of the lens. This required two sighting devices and required the operator to change his position when using either device.

The present invention embodies in one sighting device means for locating the source of illumination on the axial line of the lens and means for accurately locating this source at the focal centre of the lens. These results are secured by a sighting tube sighting on the axial line of the projecting lens and by a sighting lens of short focus within the tube so that the definition of the filament, when sighted through this lens, affords a means of definitely locating the filament, which, by the construction, is the focal centre of the projecting lens. This sighting lens has a magnifying effect on the filament so that the coils of the filament can be clearly seen when it is in the focus of this lens. The operator thus locates the filament on the axial line of the projecting lens and locates it at the focal point of this lens with one sighting operation thereby saving time and adding to the convenience in operating the device.

Referring to the drawings, 11 is the lamp or projector housing which is provided with an opening at 12 having a suitable cover, not shown in the drawings. The projecting lens 13 is centered in the housing at one end. The lamp bulb 14 is supported in the socket 16 carried by the bracket 17 which is adjustably supported on the screw stems 18 and 19 with relation to the housing and the projecting lens 13. The source of illumination comprises the concentrated filament 15 of the bulb 14 which should be located on the axial line $b$—$b$ of the lens 13 and on the intersecting line $a$—$a$ the intersecting point being the focal point of the lens 13.

The rear of the housing 21 is provided with a boss 22 which is drilled on the line $b$—$b$ to receive the tube 23 the aperture of which is designated $c$. This tube is provided with a shoulder or collar at 33 engaging the boss and the inner end is threaded to receive the boss 24 of the reflector 25 which has an aperture aligning with the aperture $c$. A disc 26 with a peep hole closes the outer end of this aperture $c$ and the inner end is closed by the double convex lens 28 and by the glass screen 27 with the cross-hairs or the centre mark 35 as indicated in Fig. 3.

The axial line of the sighting lens 28 is on line $b$—$b$ and its focal point is at the intersection of line $a$—$a$ and line $b$—$b$. Thus, the focal centres of lenses 13 and 28 are the same point and these lenses are maintained in fixed relation to each other by the housing. It will thus be seen that an object in the focus of the focusing lens 28 will be in the focus of the projecting lens 13.

The filament 15 may be sighted when it is lighted and it may be sighted in the day time when it is not lighted, by the light which is concentrated on the filament from lens 13. When the filament is lighted the screen 27 is smoked or rendered opaque to prevent irradiation or glare so that the outline of the filament can be distinguished in a sharp and magnified form through the lens 28.

The position of the filament is adjusted through the bracket 17 which is raised and lowered and tilted by manipulating the adjusting screws as more particularly described in the patent above referred to. The filament is located on the line $b$—$b$ by the markings on the screen 27 which may take the form of a central opening, concentric rings or other construction which enables the centre of this disc to be readily determined, in combination with the peep hole in disc 26.

The filament is adjusted back and forth on line $b$—$b$ towards and away from lens 28 until the position of its sharpest definition is found. This will be on line $a$—$a$ or the focal point of lens 13. It will be noted that as the distance from 15 to lens 28 is much less than the distance from 15 to lens 13, the short focal range of lens 28 enables the filament to be located with great accuracy with an increased accuracy in its location with relation to the focal point of the projecting lens 13.

The lens 28 is provided solely for focusing purposes and as commercially sold has considerable variation in its focal range. In order that commercial lenses may be used for this work, I provide an adjustable mounting for these lenses in the focusing tube 23. This comprises the slide 31 carrying the lens 28 and the screen 27 as indicated in Fig. 4 and which may be adjustably positioned in the section of increased diameter of the tube $c$ at 32. The lens 28 can thus be located on a testing stand in tube 23 and secured in position by any suitable means, so that when the sighting tubes so constructed are assembled in a housing with the collar 33 engaging the boss the focal point 15 determined by any sighting tube will be uniform.

The filament as usually constructed, has two general forms, one is triangular as indicated at 15, Fig. 5 and the other is curved as indicated at 15′, Fig. 6. In Fig. 5 the screen 27 has a central aperture at 35 and the relation of the triangular filament 15 can easily be determined on the screen with respect to this aperture.

The screen 27 may be eliminated and corresponding effects obtained from the lens 28. In this case the lens is smoked or obscured except for a ring around the outer edge, on this smoked surface the image of the filament is clearly defined and its position with relation to the centre of the lens is easily determined in practice without a central mark on the lens.

By this construction the optical centre of a projecting lens is determined by a single sighting device.

Having thus described my invention, I claim:

1. In a focusing sight for a projector, the combination, a housing having a projecting lens, a lamp bulb having a filament and a sighting tube centered on the axial line of said projecting lens, said sighting tube comprising a screen with cross-hairs for locating said axial line and a sighting lens at one end located in fixed relation to the focal point of said projecting lens and a sight at the opposite end of said tube, the position of said filament relative to said focal point being determined by the definition of the filament on said screen when sighted through said tube.

2. In a focusing sight for a projector, the combination, a housing having a projecting lens, a lamp bulb having a filament and a sighting tube centered on the axial line of said lens, said sighting tube having a screen and having means for locating said axial line and having a sighting lens at one end located in fixed relation to the focal point of said projecting lens and a sight at the opposite end of said tube, the position of said filament relative to said focal point being determined by the definition of the filament on said screen when sighted through said tube.

3. In a focusing sight for a projector, the combination, a housing having a projecting lens, a lamp bulb having a filament and a sighting tube centered on the axial line of said lens, means in said tube for locating said axial line, said sighting tube having a screen and a sighting lens adjustably positioned in said tube and located relative to the focal point of said projecting lens and a sight in said tube, the position of said filament relative to said focal point being determined by the definition of the filament on said screen when sighted through said tube.

Signed at New York, in the county of New York and State of New York this 15th day of June, A. D. 1926.

EDWARD A. EVERETT.